US012732102B2

(12) United States Patent
Shen et al.

(10) Patent No.: US 12,732,102 B2
(45) Date of Patent: Sep. 8, 2026

(54) CONTROL METHOD, PULSE DISTRIBUTION MODULE AND CONTROL CIRCUIT

(71) Applicant: Nanjing Silergy Micro Technology Co., Ltd., Nanjing (CN)

(72) Inventors: Zhiyuan Shen, Nanjing (CN); Peng Zhou, Nanjing (CN); Zhaolong Yu, Nanjing (CN); Zhengyong Ding, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 217 days.

(21) Appl. No.: 18/627,816

(22) Filed: Apr. 5, 2024

(65) Prior Publication Data

US 2024/0348165 A1 Oct. 17, 2024

(30) Foreign Application Priority Data

Apr. 12, 2023 (CN) ......................... 202310388844.7

(51) Int. Cl.

*H02M 3/156* (2006.01)
*H02M 1/00* (2006.01)
*H02M 3/158* (2006.01)

(52) U.S. Cl.

CPC ....... *H02M 3/1566* (2021.05); *H02M 1/0019* (2021.05); *H02M 1/0038* (2021.05); *H02M 3/1584* (2013.01)

(58) Field of Classification Search

CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069

See application file for complete search history.

(56) References Cited

U.S. PATENT DOCUMENTS

| | | | | |
|---|---|---|---|---|
| 8,405,370 | B2 | 3/2013 | Chen | |
| 9,054,546 | B2 | 6/2015 | Zhao | |
| 9,287,782 | B2 | 3/2016 | Chen | |
| 9,444,441 | B2 | 9/2016 | Hou et al. | |
| 9,543,822 | B2 | 1/2017 | Hang et al. | |
| 10,476,378 | B2 | 11/2019 | Wang et al. | |
| 11,159,051 | B2 | 10/2021 | Yu et al. | |
| 2013/0214751 | A1* | 8/2013 | Shiraishi ............. | H02M 3/1584 323/272 |
| 2018/0342951 | A1* | 11/2018 | Dias ...................... | H02M 3/156 |
| 2021/0242784 | A1 | 8/2021 | Yang et al. | |
| 2022/0294343 | A1* | 9/2022 | Peretz ................ | H02M 3/1566 |

* cited by examiner

*Primary Examiner* — Bryan R Perez

(57) ABSTRACT

A method of controlling a power converter comprising N phase power stage circuits coupled in parallel, where N is a positive integer, can include: controlling an operating mode of the power converter; and disabling at least one pulse in a first trigger signal for controlling each phase power stage circuit in the power converter to start operating, in order to reduce a fluctuation amplitude of the output signal.

18 Claims, 7 Drawing Sheets

CONTROL METHOD, PULSE DISTRIBUTION MODULE AND CONTROL CIRCUIT

RELATED APPLICATIONS

This application claims the benefit of Chinese Patent Application No. 202310388844.7, filed on Apr. 12, 2023, which is incorporated herein by reference in its entirety.

FIELD OF THE INVENTION

The present invention generally relates to the field of power electronics, and more particularly to control circuits and methods, and pulse distribution modules.

BACKGROUND

Voltage regulators with multi-phases connected in parallel are widely used in high-power and high-current applications because of their relatively small voltage and current ripple, as well as excellent thermal performance. With development of big data and cloud services, the change rate of the operating current of the central processing unit and graphics processing unit is increasing, which can pose challenges to the stability of the output voltage of the voltage regulator. During loop saturation caused by a decreased load, as the ramp signal increases, the loop comparator may generate a trigger signal. This can cause the total inductor current to rise prematurely, thereby resulting in large fluctuations in the output voltage.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
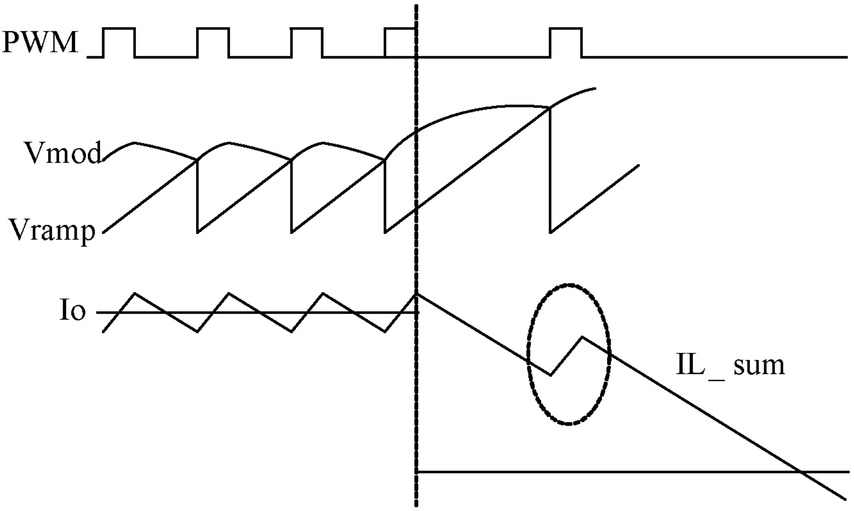
FIG. 1 is a schematic block diagram of an example multi-phase converter.

Referring now to FIG. 1, shown is a schematic block diagram of an example multi-phase converter. In this example multi-phase buck converter, when the load decreases, the main transistor of the multiphase buck converter controlled based on constant on-time (COT) should be turned off during the loop saturation period. However, as ramp signal Vramp rises, ramp signal Vramp may be greater than modulation signal Vmod, and drive signal PWM can control the main transistor to be turned on for an additional period of time. Thus, total inductor current IL_sum may not decrease, but instead increase. The difference between total inductor current IL_sum and load current Io can charge the output capacitor, which may cause a large drop in the output voltage and affect the performance of the voltage regulator.

Figure 2:
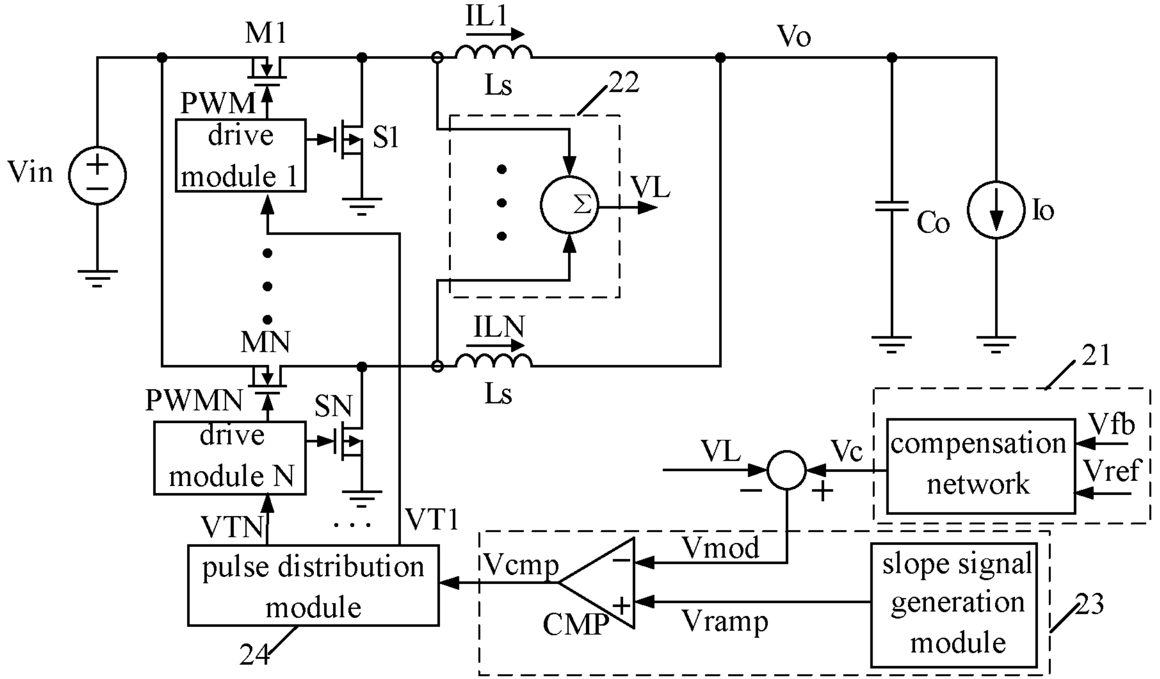
FIG. 2 is a schematic block diagram of an example control circuit of a power converter based on COT control, in accordance with embodiments of the present invention.

Referring now to FIG. 2, shown is a schematic block diagram of an example control circuit of a power converter based on COT control, in accordance with embodiments of the present invention. In this particular example, the power converter can include N-phase power stage circuits (e.g., N is a positive integer), and the input terminals of each phase power stage circuit can connect in parallel to receive input voltage Vin. The output terminals of each phase power stage circuit can connect in parallel to output capacitor Co, and may generate output voltage Vo that is nearly constant. For example, each phase power stage circuit can be a buck circuit. It should be understood that particular embodiments are also applicable to other types of power stage circuits. In this example, each phase power stage circuit can include a switching network including upper transistor Mi and lower transistor Si (where i=1, 2, . . . , N), and inductor Ls connected between a switching node of the upper and lower transistors and the output terminal.

The control circuit can include voltage feedback unit 21. Feedback signal Vfb may be obtained by sampling output voltage Vo. Here, Io is the load current. Voltage feedback unit 21 can include a compensation network that may receive feedback signal Vfb and reference signal Vref, and can generate compensation signal Vc after loop compensation based on an error between reference signal Vref and feedback signal Vfb. Here, reference signal Vref can characterize an expected value of output voltage Vo. It should be understood that the compensation network can use any suitable approach (e.g., a PI compensation network. The control circuit can also include current sampling unit 22 and loop comparison unit 23. Current sampling unit 22 may obtain current signal VL representative of total inductor current IL_sum that is the sum of the inductor currents of each phase power stage circuit. Loop comparison unit 23 can include comparator CMP, which can compare slope signal Vramp generated by a slope signal generation module against modulation signal Vmod, in order to generate trigger signal Vcmp. Modulation signal Vmod can be generated by loop compensation for an error between compensation signal Vc and current signal VL.

The control circuit can also include pulse distribution module 24, which may receive trigger signal Vcmp, and distribute the pulses in trigger signal Vcmp to each phase power stage circuit, in order to generate phase trigger signal VT1-VTN for controlling the turn-on moment of each phase power stage circuit. Phase trigger signal VT1-VTN can pass through drive module 1-N to generate drive signals PWM1-PWMN for controlling the switching state of the transistor in each phase power stage circuit. In this example, constant on time control may be adopted, and the trigger signal can control the main transistor of the corresponding phase to be turned on, and turned off after the constant on time. It should be understood that other control methods (e.g., pulse-width modulation control) may additionally or alternatively be used in certain embodiments.

Particular embodiments may optimize the design of the pulse distribution module, such that when the power converter enters a first operation mode (e.g., when the load is decreased), at least one pulse in trigger signal Vcmp generated by the comparator may be shielded. This can delay a moment when total inductor current IL_sum is increased (e.g., the moment marked by a virtual coil) during the load decreasing period, thereby reducing the fluctuation amplitude of the output voltage. There are many suitable ways to determine that the load is decreasing. In this example detection output voltage, when the output voltage rises to be greater than a first threshold, the load can be determined to decrease, and the power converter can be controlled to enter the first operation mode. In other examples, the load can be determined to decrease by detecting the output current. In addition, the number of pulses in trigger signal Vcmp can be selected to be shielded according to particular system requirements. For example, the number of pulses to be shielded can be selected according to a degree that the output voltage of the power converter is greater than the first threshold. When the difference between the output voltage and the first threshold is larger, the number of the pulses to be shielded can accordingly be larger.

In addition, in order to ensure the dynamic response speed of the system, when total inductor current IL_sum drops to the output current, the pulse in trigger signal Vcmp may no longer be longer shielded, as otherwise the dynamic response speed may slow down. Therefore, all the pulses in trigger signal Vcmp can be shielded in the time interval from a start moment of the output voltage being greater than the first threshold to an end moment when the total inductor current drops to the output current. However, in some examples, total inductor current IL_sum may not be sampled, so the number of pulses in the first trigger signal to be shielded can be selected according to particular system requirements. If the number of pulses in the first trigger signal to be shield is too large, the dynamic response speed of the system may slow down. The following examples show total inductor current IL_sum by non-sampling.

Figure 3:
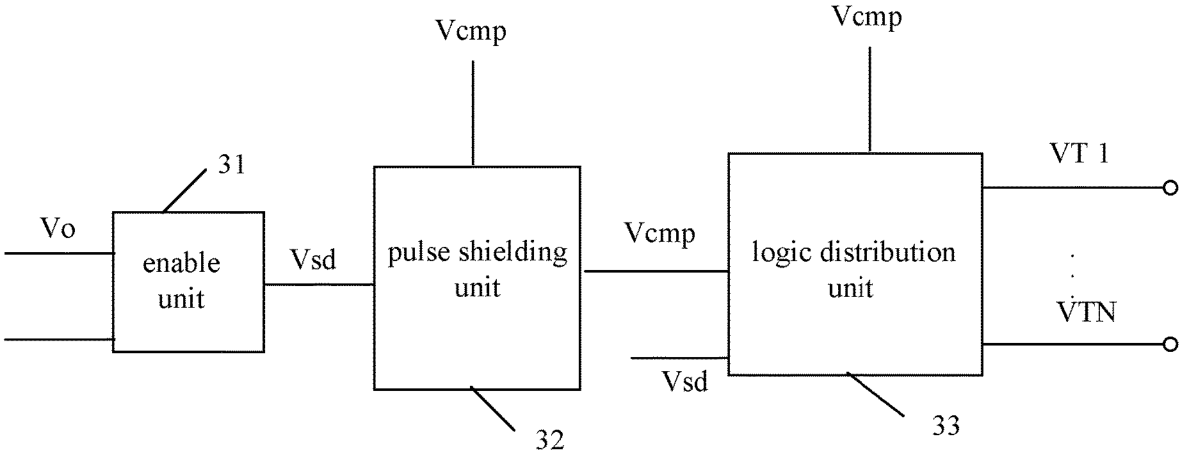
FIG. 3 is a schematic block diagram of a first example pulse distribution module, in accordance with embodiments of the present invention.

Referring now to FIG. 3, shown is a schematic block diagram of a first example pulse distribution module, in accordance with embodiments of the present invention. In this particular example, the pulse distribution module can include enable unit 31 and pulse shielding unit 32. Enable unit 31 can detect the output signal of the power converter to determine the state of the load, in order to control the operation mode of the power converter. Enable unit 31 can activate enable signal Vsd when the load is decreased. Pulse shielding unit 32 can shield at least one pulse in trigger signal Vcmp that controls each phase power stage circuit in the power converter to start operating when the power converter enters the first operating mode, thereby delaying the moment when the total inductor current of the power converter increases. Pulse shielding unit 32 can select the number of pulses of trigger signal Vcmp that needs to be shielded, and may be controlled by enable signal Vsd to shield the pulses of trigger signal Vcmp to generate trigger signal Vcmp'.

In one embodiment, the pulse distribution module can also include logic distribution unit 33. Logic distribution unit 33 can allocate total trigger signal VT to each phase power stage circuit in turn to control the operating timing of each phase power stage circuit. When the power converter is in the first operating mode (e.g., enable signal Vsd is active), trigger signal Vcmp' can be selected as total trigger signal VT. When the power converter is in the second operating mode (e.g., enable signal Vsd is inactive), trigger signal Vcmp can be selected as total trigger signal VT. In addition, pulse shielding module 32 can select the number of pulses in trigger signal Vcmp that need to be shielded according to the degree that the output voltage of the power converter is greater than the first threshold, and may not perform pulse shielding after the total inductor current drops to the output current of the power converter.

Figure 4:
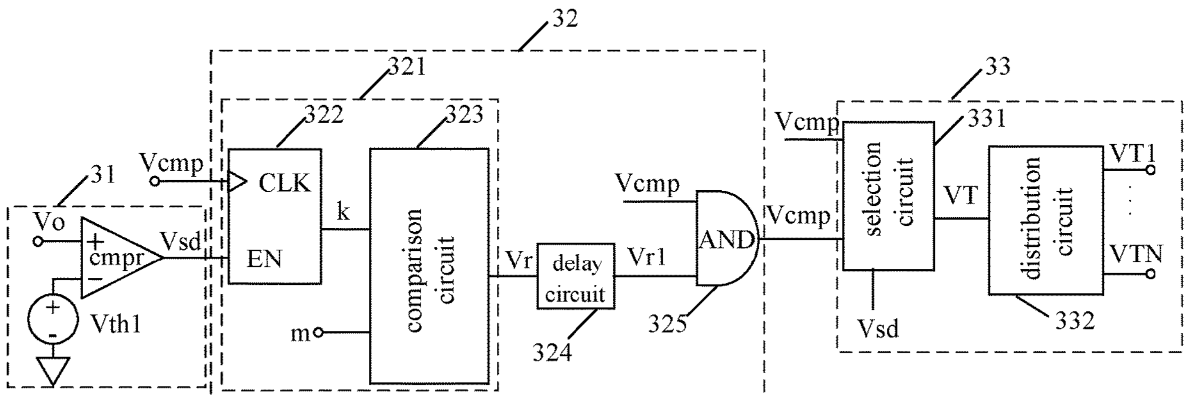
FIG. 4 is a schematic block diagram of a second example pulse distribution module, in accordance with embodiments of the present invention.

Referring now to FIG. 4, shown is a schematic block diagram of a second example pulse distribution module, in accordance with embodiments of the present invention. In this particular example, enable unit 31 can include comparator cmpr that can compare output voltage Vo against threshold Vth1, in order to generate enable signal Vsd. When output voltage Vo is greater than threshold Vth1, enable signal Vsd may be activated, indicating that the load is reduced, thereby controlling the power converter to enter the first operating mode. Here, e.g., threshold Vth1 is greater than reference signal Vref that characterizes the expected value of output voltage Vo. Further, threshold Vth1 can be selected under the worst condition. For example, when the largest range of load variation, the maximum value of threshold Vth1 can be determined according to the sum of the increased amplitude of the output voltage at the arrival moment of the first pulse in trigger signal Vcmp and reference signal Vref after enable signal Vsd is activated.

In one embodiment, pulse shielding unit 32 can include count module 321, which can be controlled by enable signal Vsd to start counting the pulses in trigger signal Vcmp, and may activate indication signal Vr when count value k is not less than count threshold m. Further, count module 321 can include counter 322 and comparison circuit 323. Counter 322 can be enabled to count when enable signal Vsd is active. When the rising edge of the pulse of trigger signal Vcmp comes, count value k can be incremented, and finally count value k may be output. Comparison circuit 323 can compare count value k against count threshold m. When count value k is not less than count threshold m, indication signal Vr can be active and the counting completed. When count value k is less than count threshold m or enable signal Vsd is inactive, indication signal Vr may be inactive.

Pulse shielding unit 32 can also include delay circuit 324, which can delay the rising edge of indication signal Vr by time Td to obtain indication signal Vr1. Also, the falling edge of indication signal Vr1 may be consistent with (e.g., the same time as) the falling edge of indication signal Vr. In this example, when the rising edge of the pulse of trigger signal Vcmp comes, count value k can be incremented, so time Td should be slightly larger than the pulse width of trigger signal Vcmp, in order to ensure that the m-th pulse in trigger signal Vcmp can be shielded. As another example, when the falling edge of the pulse of trigger signal Vcmp comes, count value k can be incremented. At this time, time Td may only need to be slightly larger than zero to ensure that the m-th pulse can be shielded. In one example, pulse shielding unit 32 can also include logic circuit 325. Logic circuit 325 can output indication signal Vr1 by trigger signal Vcmp being logically AND'ed with indication signal Vr1 when enable signal Vsd is active, thus shielding the first m pulses in trigger signal Vcmp from the moment when enable signal Vsd is active.

Logic distribution unit 33 can allocate the pulses in trigger signal Vcmp' to each phase power stage circuit in turn when the power converter is in the first operation mode (e.g., signal Vsd is active). When the power converter is in the second operation mode (e.g., signal Vsd is inactive), the pulses of trigger signal Vcmp can be allocated to each phase power stage circuit in turn. For example, logic distribution unit 33 can include selection circuit 331, which can select trigger signal Vcmp' output as total trigger signal VT during the active period of enable signal Vsd. Also, during the inactive period of enable signal Vsd, logic distribution unit 33 may select trigger signal Vcmp as total trigger signal VT. Logic distribution unit 33 can also include distribution circuit 332, and the pulses of total trigger signal VT may successively be assigned to each phase power stage circuit as trigger signals VT1-VTN of each phase. It should be understood that there are many suitable ways to realize distribution circuit 332, and any circuit that can realize the same or similar distribution functionality can be utilized in certain embodiments.

In particular embodiments, m may represent the number of pulses that need to be blocked shielded when the load is reduced, which can be set according to system requirements. Because total inductor current IL_sum may not be sampled, and the pulse can be shielded before output voltage Vo drops to threshold Vth1, if the value of m is large, the pulse may still be shielded after the total inductor current has decreased to output current Io. This can cause the system to slow down the dynamic response speed. In this way, the value of m may accordingly need to be taken into account. When sampling total inductor current IL_sum, the pulses of trigger signal Vcmp can be shielded during an interval from a moment when the output voltage is greater than threshold Vth1 to a moment when total inductor current IL_sum has decreased to be equal to output current Io. In other examples, the first m pulses in trigger signal Vcmp can also be shielded during this interval.

Figure 5:
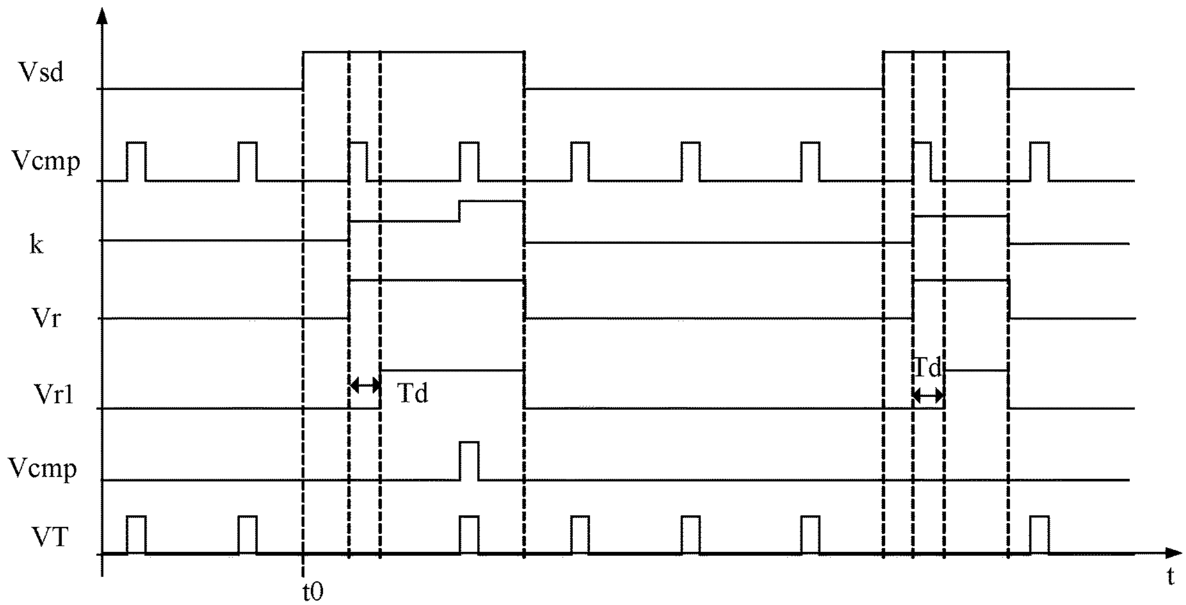
FIG. 5 is a waveform diagram of example operation of a pulse distribution module, in accordance with embodiments of the present invention.

Referring now to FIG. 5, shown is a waveform diagram of example operation of a pulse distribution module, in accordance with embodiments of the present invention. In this particular example, m=1, and at time to, output voltage Vo may be greater than threshold Vth1, so enable signal Vsd can be active (e.g., at a high level). When the rising edge of the first pulse of trigger signal Vcmp comes, count value k can be increased by 1, k=m=1, so indication signal Vr may be active. After that, k can be greater than m, and indication signal Vr may remain active until enable signal Vsd is inactive. The rising edge of indication signal Vr can be delayed by time Td, and indication signal Vr1 may be obtained. Trigger signal Vcmp' can be obtained by indication signal Vr1 being logically AND'ed with trigger signal Vcmp. Therefore, the first pulse of trigger signal Vcmp can be shielded after enable signal Vsd is active, and total trigger signal VT can be output from the second pulse of trigger signal Vcmp.

Figure 6:
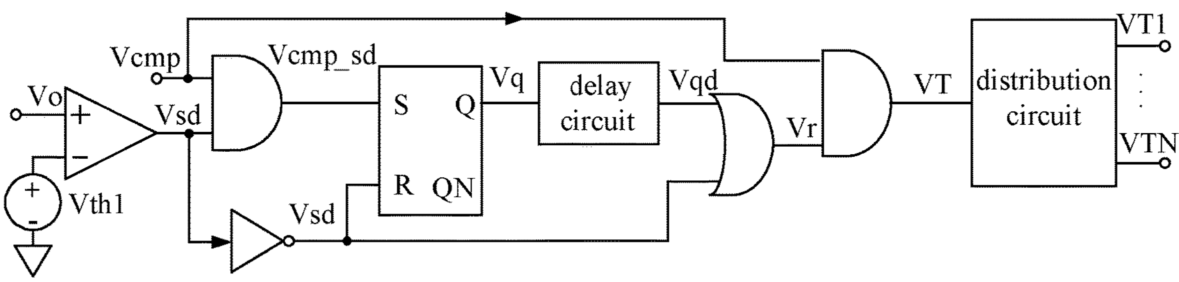
FIG. 6 is a schematic block diagram of a third example pulse distribution module, in accordance with embodiments of the present invention.

Referring now to FIG. 6, shown is a schematic block diagram of a third example pulse distribution module, in accordance with embodiments of the present invention. In this particular example, during the active period of enable signal Vsd, when trigger signal Vcmp is active, output signal Vq at terminal Q of the RS flip-flop can be active, signal Vqd may be generated by delaying the rising edge of output signal Vq by the delay circuit, and inversion signal Vsd' of enable signal Vsd can be inactive. Indication signal Vr may be generated by inversion signal Vsd' being logically OR'ed with signal Vqd and can be consistent with signal Vqd. Also, total trigger signal VT can be generated by indication signal Vr being logically AND'ed with trigger signal Vcmp, thereby shielding the pulse within the delay time of the delay circuit. When enable signal Vsd is inactive, the RS flip-flop may be reset, signal Vq can be inactive, signal Vqd may also be inactive, and inversion signal Vsd' can be active. After inversion signal Vsd' is logically OR'ed with signal Vqd, indication signal Vr can be active. Therefore, total trigger signal VT may be determined by trigger signal Vcmp, thereby ensuring that the pulse in the first trigger signal is not shielded in the second operating mode. When m=1, the delay time can be set to be slightly larger than a pulse width of trigger signal Vcmp, which can realize the shielding of the first pulse of trigger signal Vcmp after enable signal Vsd is active.

Figure 7:
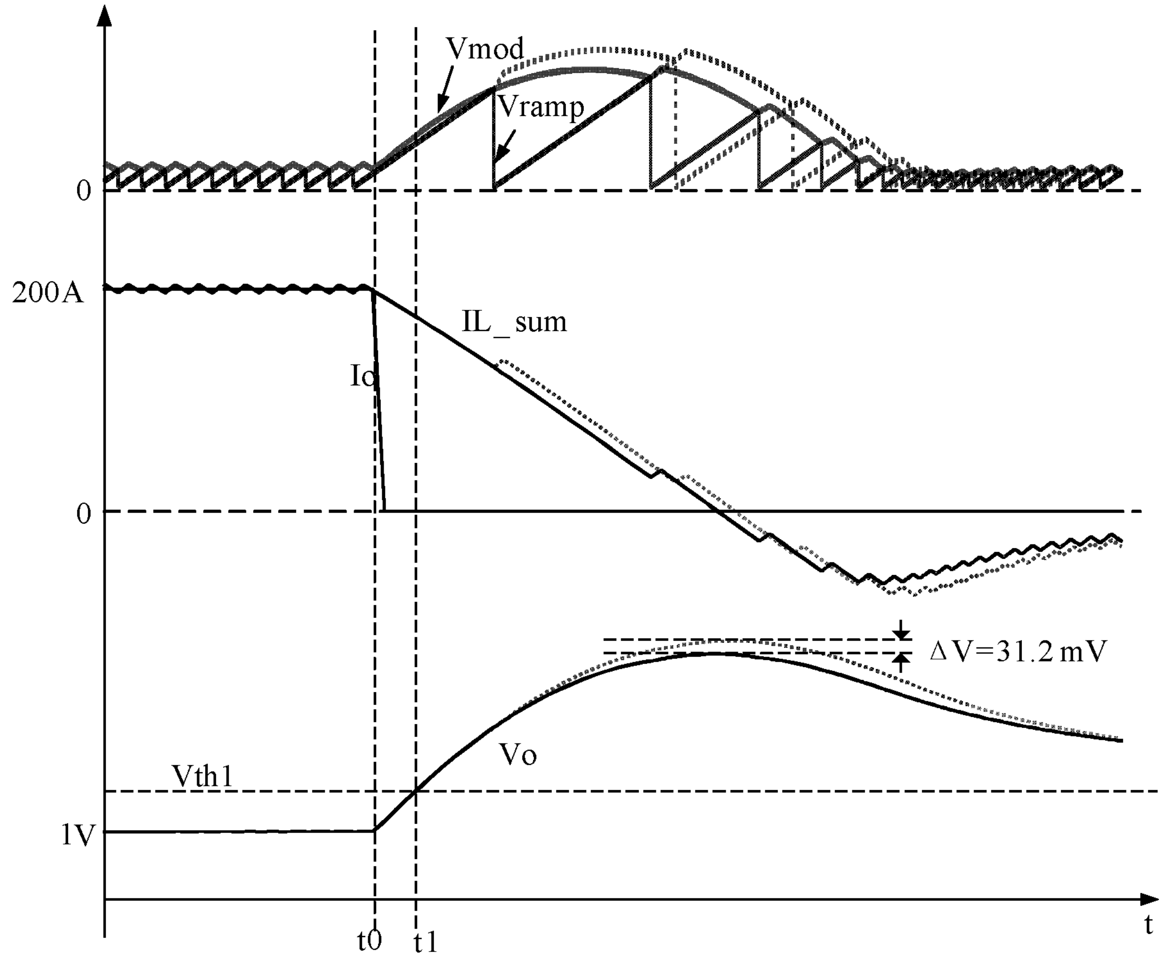
FIG. 7 a waveform diagram of example operation of a power converter, in accordance with embodiments of the present invention.

Referring now to FIG. 7, shown is a waveform diagram of example operation of a power converter, in accordance with embodiments of the present invention. The dashed line waveforms are the waveforms without the example control method of particular embodiments, and the solid line waveforms are the waveforms with the example control method of particular embodiments. In this particular example, in the steady-state output voltage Vo=1V. At time t0, output current Io can be decreased from 200 A to 0. At time t1, output voltage Vo can rise to threshold Vth1, then the power converter may be controlled to enter the first operation mode, and the pulse of the first trigger signal can be shielded. Due to the control method of particular embodiments, the first pulse of the first trigger signal after entering the first operation mode can be shielded, the moment when total inductor current IL_sum increases may be delayed, and the difference between total inductor current IL_sum and output current Io can be reduced. This can the fluctuation amplitude of output voltage Vo in the transient state by, e.g., 31.2 mV.

The above pulse distribution method can be applied to single-phase power converters and multi-phase power converters; that is, the power converter can include one-phase power stage circuit or multi-phase power stage circuits. When the power converter includes a phase power stage circuit, by shielding the pulse of the first trigger signal, the operation of the power converter may be delayed, thereby delaying the moment when the total inductor current of the power converter increases. When the power converter includes multi-phase power stage circuits, by shielding the pulse of the first trigger signal, the operation of a certain phase or several phases can be delayed, thereby delaying the moment when the total inductor current of the power converter increases during the load decreasing period.

Accordingly, during the time period that the load transitions to a light load, particular embodiments may shield at least one pulse of the first trigger signal used to control each phase power stage circuit in the power converter to start operating, thereby delaying the moment when the total inductor current of the power converter increases, and reducing the fluctuation of the output voltage.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a power converter comprising N phase power stage circuits coupled in parallel, wherein N is a positive integer, the method comprising:

a) controlling an operating mode of the power converter;

b) disabling at least one pulse in a first trigger signal for controlling each phase power stage circuit in the power converter to start operating, in order to reduce a fluctuation amplitude of the output signal;

c) starting counting the pulses in the first trigger signal when an enable signal is active, and increasing a count value when each pulse in the first trigger signal arrives; and d) activating a first indication signal representing the counting is completed when the count value is not less than a count threshold, and deactivating the first indication signal when the count value is less than the count threshold or the enable signal is inactive.

2. The method of claim 1, further comprising:

a) generating the first trigger signal with a square waveform in accordance with an error between an output signal and a reference signal;

b) generating N pulse-width modulation (PWM) control signals for the N phase power stage circuits in accordance with the first trigger signal; and c) detecting an output signal to control the operating mode of the power converter.

3. The method of claim 2, further comprising:

a) performing loop compensation on an error between a feedback signal of an output voltage and a reference signal to generate a compensation signal;

b) performing loop compensation on an error between the compensation signal and a current signal representing a total inductor current to generate a modulation signal; and c) comparing the modulation signal against a ramp signal to generate the first trigger signal.

4. The method of claim 1, wherein:

a) the pulse of the first trigger signal is enabled in a time interval when an output voltage is less than a threshold signal; and b) at least one pulse in the first trigger signal is disabled in a time interval when the output voltage is not less than the threshold signal.

5. The method of claim 1, wherein when an output voltage of the power converter is greater than a first threshold, the power converter is controlled to enter a first operating mode.

6. The method of claim 1, wherein a number of pulses in the first trigger signal to be disabled is selected according to a difference between an output voltage of the power converter and the first threshold, such that the number of the pulses to be shielded is larger when the difference is larger.

7. The method of claim 1, wherein the pulses of the first trigger signal are not shielded when a total inductor current drops to an output current of the power converter.

8. The method of claim 1, wherein:

a) when the power converter is in the first operation mode, pulses in a second trigger signal generated based on the first trigger signal are allocated to each phase power stage circuit; and b) when the power converter is in a second operation mode, the pulses of the first trigger signal are allocated to each phase power stage circuit.

9. A control circuit for a power converter comprising N power stage circuits coupled in parallel, wherein N is a positive integer, the control circuit comprising:

a) an enable unit configured to control an operation mode of the power converter;

b) a pulse shielding unit configured to disable at least one pulse in a first trigger signal for controlling each phase power stage circuit in the power converter to start operating when the power converter enters a first operating mode, in order to reduce a fluctuation amplitude of the output signal;

c) wherein the pulse shielding unit comprises a counting module having a first counter configured to start counting the pulses in the first trigger signal when an enable signal generated by the enable unit is active, and to increase a count value when each pulse in the first trigger signal arrives; and d) wherein the counting module comprises a comparison circuit configured to activate a first indication signal representing the counting is completed when the count value is not less than the count threshold, and to deactivate the first indication signal when the count value is less than the count threshold or the enable signal is inactive.

10. The control circuit of claim 9, wherein:

a) the pulse of the first trigger signal is enabled in a time interval when an output voltage is less than a threshold signal; and b) at least one pulse in the first trigger signal is disabled in a time interval when the output voltage is not less than the threshold signal.

11. The control circuit of claim 9, wherein the enable unit comprises a comparator configured to compare an output voltage of the power converter against a first threshold, wherein:

a) when the output voltage rises above the first threshold, an enable signal is generated and is active to control the power converter to enter the first operating mode; and b) when an output voltage drops below the first threshold, the enable signal is inactive to control the power converter to enter a second operation mode.

12. The control circuit of claim 9, wherein the pulse shielding unit is configured to select the number of pulses in the first trigger signal to be disabled, and to disable the corresponding number of pulses to generate a second trigger signal when the power converter enters the first operation mode.

13. The control circuit of claim 9, wherein the pulse shielding unit is configured to select the number of pulses to be disabled according to a difference between an output voltage of the power converter and the first threshold, such that the number of pulses to be shielded is larger when the difference is larger.

14. The control circuit of claim 9, wherein the pulse shielding unit further comprises a delay circuit configured to output a second indication signal after delaying the rising edge of the first indication signal for a first time, wherein the first time is greater than a pulse width of the first trigger signal.

15. The control circuit of claim 14, wherein the pulse shielding unit further comprises a logic circuit configured to output the second trigger signal when both the second indication signal and the first trigger signal are active.

16. The control circuit of claim 9, further comprising a feedback control circuit configured to generate the first trigger signal for controlling each phase power stage circuit to start operating according to a feedback signal representing an output voltage and a current sampling signal representing a total inductor current through loop compensation.

17. The control circuit of claim 9, comprising:

a) a logic distribution unit configured to sequentially distribute the pulses of a second trigger signal generated by disabling at least one pulse in the first trigger signal to each phase power stage circuit when the power converter is in the first operation mode; and b) wherein when the power converter is in the second operation mode, the pulses of the first trigger signal are sequentially distributed to each phase power stage circuit, in order to control an operation timing of each phase power stage circuit.

18. The control circuit of claim 17, wherein the logic distribution unit comprises:

a) a selection circuit configured to select the second trigger signal as a total trigger signal when the power converter is in the first operation mode, and to select the first trigger signal as the total trigger signal when the power converter is in the second operation model; and b) a distribution circuit configured to sequentially distribute the total trigger signal to each phase power stage circuit to control a main switch in each phase power stage circuit to be turned on.

* * * * *